United States Patent [19]

Gardner

[11] 4,346,730
[45] Aug. 31, 1982

[54] VALVE FOR ABRASIVE MATERIAL

[75] Inventor: Harold S. Gardner, Turtle Creek, Pa.

[73] Assignee: The United States of America as represented by the United States Department of Energy, Washington, D.C.

[21] Appl. No.: 224,870

[22] Filed: Jan. 14, 1981

[51] Int. Cl.³ .............................................. F16L 7/00
[52] U.S. Cl. .................................. 137/375; 251/315; 251/368; 406/193
[58] Field of Search ................ 137/375; 251/118, 315, 251/368; 406/193; 277/DIG. 6

[56] References Cited

U.S. PATENT DOCUMENTS

| | | | |
|---|---|---|---|
| 1,000,173 | 8/1911 | Hughes | 137/375 |
| 1,584,007 | 5/1926 | Brown | 251/333 |
| 3,167,088 | 1/1965 | McInerney | 137/375 |
| 3,306,316 | 2/1967 | Stillwagon | 137/375 |
| 3,386,699 | 6/1968 | Petter et al. | 251/315 |
| 3,464,598 | 9/1969 | Curry, Jr. | 222/559 |
| 3,614,061 | 10/1971 | Fitzpatrick | 251/327 |
| 3,662,986 | 5/1972 | Domulewicz | 251/144 |
| 3,689,027 | 9/1972 | Grenier | 251/315 |
| 3,701,359 | 10/1972 | Worley et al. | 137/375 |
| 3,726,306 | 4/1973 | Purvis | 137/375 |
| 4,010,775 | 3/1977 | Roberts | 138/142 |
| 4,079,747 | 3/1978 | Roberts | 137/375 |
| 4,136,709 | 1/1979 | Rogers et al. | 137/375 |

FOREIGN PATENT DOCUMENTS 2540482 3/1976 Fed. Rep. of Germany ... 277/DIG. 6

*Primary Examiner*—H. Jay Spiegel
*Attorney, Agent, or Firm*—L. A. De Paul

[57] ABSTRACT

A ball valve assembly for controlling the flow of abrasive particulates including an enlarged section at the bore inlet and an enlarged section at the bore outlet. A refractory ceramic annular deflector is positioned in each of the enlarged sections, substantially extending the useful life of the valve.

7 Claims, 9 Drawing Figures

VALVE FOR ABRASIVE MATERIAL

GOVERNMENT CONTRACT

This invention was made or conceived in the course of or under a contract with the United States Government, as represented by the United States Department of Energy, the contract being identified as No. EF-77-C-01-1514.

BACKGROUND OF THE INVENTION

1. Field of the Invention

This invention relates to ball valves, and more particularly to ball valves controlling the flow of a high temperature abrasive fluid-particulate mixture.

2. Description of the Prior Art

In processes where valves are used to control flow of an abrasive fluid medium, particularly at high temperatures, there is a tendency to rapidly erode valve interior components and the valve body. This is particularly evident in processes for treating coal or other hydrocarbonaceous materials, such as coal gasification and liquefaction systems.

For example, it was found that high temperature, stainless steel ball valves experienced a useful life limited to 35 to 50 hours when used in the inlet piping of a demonstration coal gasification unit. This piping transported particulate coal and/or char in a transport gas, such as recycled product gas, at a temperature of approximately 110° C. The erosion occurred at the valve body interior, both at the inlet and outlet, as well as at the valve ball.

It is thus desirable to provide an improved valve which is not as susceptible to erosive degradation. Preferably the improved valve should require only minimum modification, not utilize exotic, expensive materials, and substantially extend the valve useful life.

SUMMARY OF THE INVENTION

This invention provides an improved valve arrangement which extends the useful life of valves, and particularly ball valves, when utilized to control flow of an abrasive fluid medium. It is particularly useful in systems processing particulate coal, char or other hydrocarbonaceous materials, particularly at high temperatures, such as in coal gasification and liquefaction systems.

In preferred form an annular portion of the valve body, at the inlet and the outlet, is removed so as to create a cylindrical step and ledge at the inlet bore and outlet bore. An annular, cylindrical ceramic deflector is then placed against the ledge, and maintained in position axially between the ledge and a spiral wound gasket overlying the inlet to the valve housing. Lateral positioning is maintained by a close tolerance between the deflector outer periphery and the bore, allowing only for relative thermal expansion between the deflector and the valve body.

The inside diameter of the ceramic deflector is equal to or slightly larger than the valve bore. With this arrangement not only is the metal valve body protected from erosion by the impact of the abrasive medium upon the ceramic deflector as opposed to the metallic valve body, but also, the flow is deflected by the deflector toward the center of the bore.

BRIEF DESCRIPTION OF THE DRAWINGS

The advantages, nature and additional features of the invention will become more apparent from the following description, taken in connection with the accompanying drawings, in which.

DESCRIPTION OF THE PREFERRED EMBODIMENTS

Figure 1A:
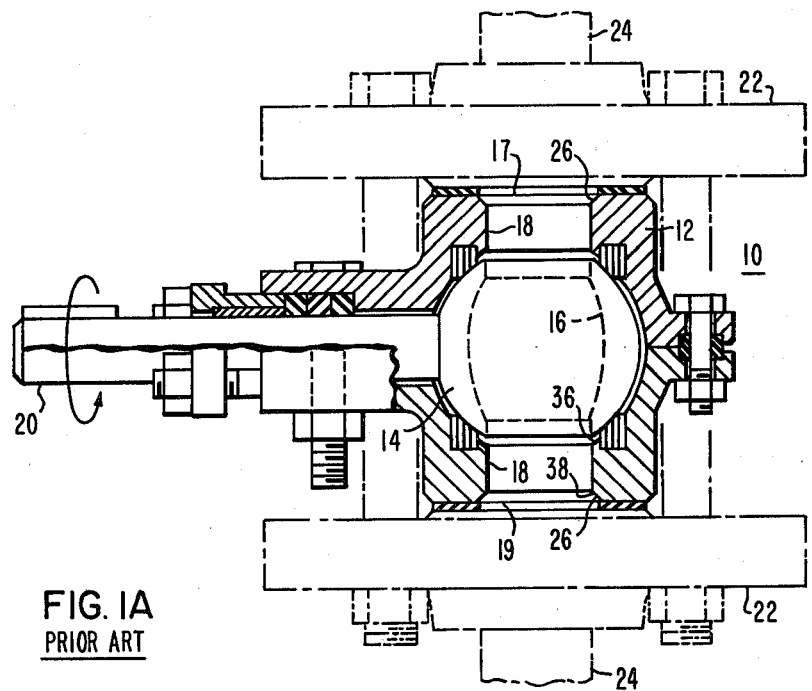
FIGS. 1A and 1B are cross-sectional views of a valve showing respectively the prior art and the disclosed invention.
Figure 2:
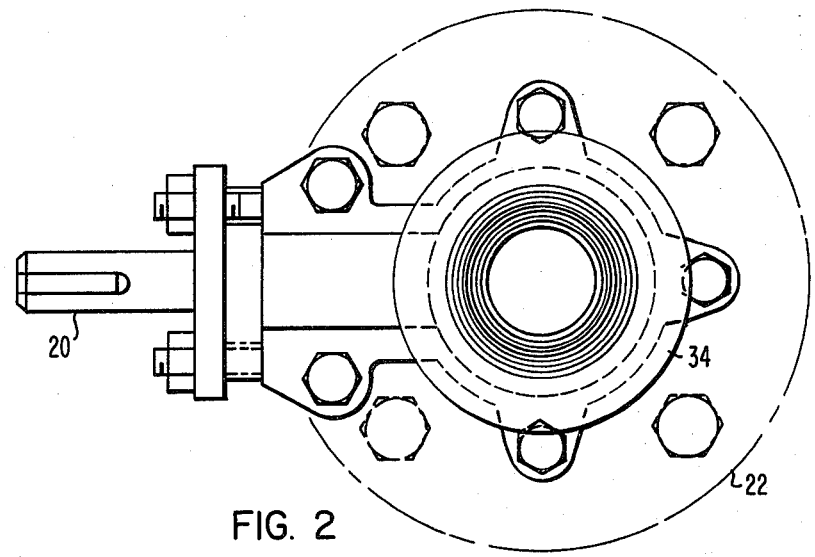
FIG. 2 is a view taken at II—II of FIG. 1.
Figure 1B:
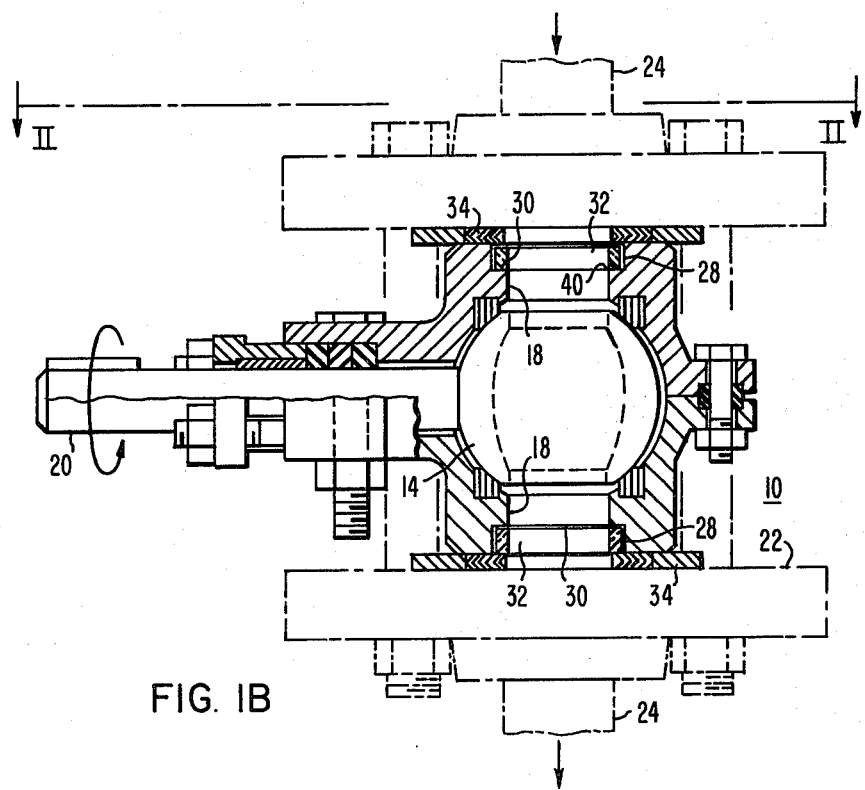
Figure 5:
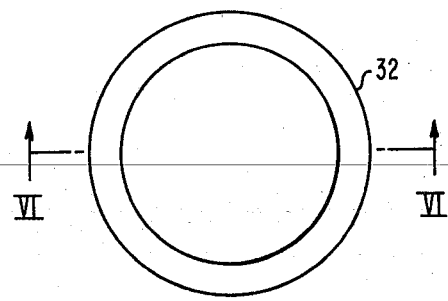
FIG. 5 is a plan view of a deflector in accordance with the invention.
Figure 6:
FIG. 6 is a cross-sectional view taken at VI—VI of FIG. 5.
Figure 7:
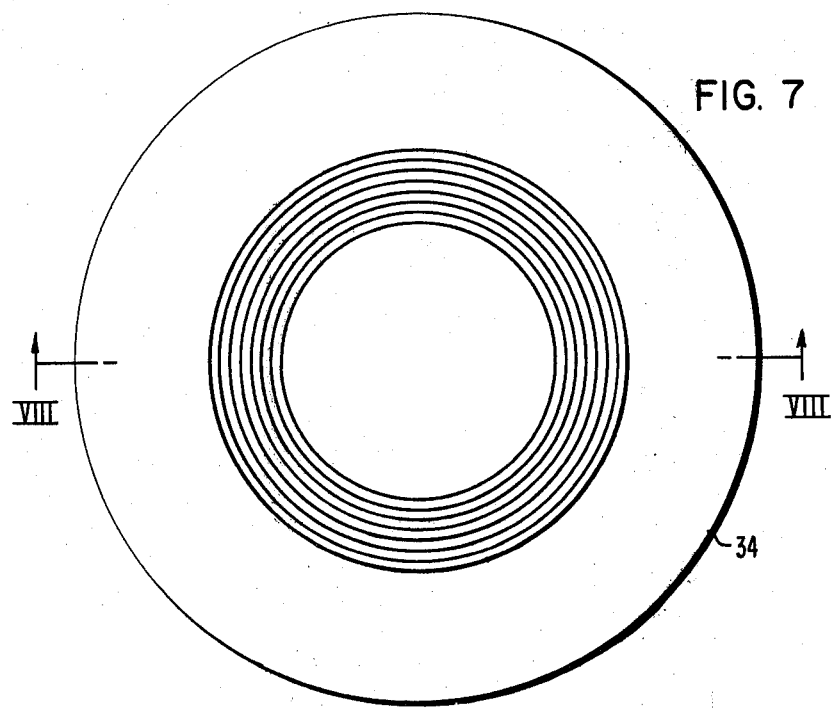
FIGS. 7 and 8 are respectively, plan and section views of a spiral wound gasket.
Figure 8:

Referring now to FIGS. 1A and 1B, there is shown a metallic ball valve 10 including a housing 12 and a ball 14 having an aperature 16. The housing 12 is provided with a cylindrical bore 18 completely therethrough, between a first outer inlet surface 17 and a second outer outlet surface 19 of the housing. To open the valve 10 and allow flow therethrough, the aperture 16 in the ball is aligned with the bore 18. To close the valve 10 and preclude flow therethrough, the ball 14 is rotated 90°, through rotation of a shaft 20. The valve 10 is positioned between two flanges 22 and corresponding conduits 24, shown in phantom.

The inlet and outlet portions of the valve 10 as shown in FIG. 1A represent a typical prior art configuration, including merely a chamfer 26 into the bore 18. This configuration is typical for both the inlet 17 and outlet 19 of a prior art type valve. The inlet portion 17 of the valve 10, in accordance with the invention, FIG. 1B, includes a second cylindrical bore 28, which is concentric with bore 18, and penetrates the housing 12 to a limited predetermined depth at both the inlet and outlet. In this manner there is a ninety degree step between the bore 18 and the bore 28, forming a ledge 30. The bores 28, 18 can be considered as being conterminous at the ledge 30.

Figure 3:
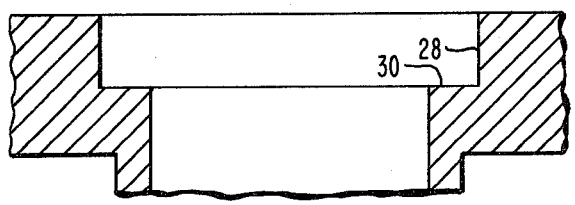
FIG. 3 is an enlarged sectional view of the inlet area of the valve of FIG. 1.
Figure 4:
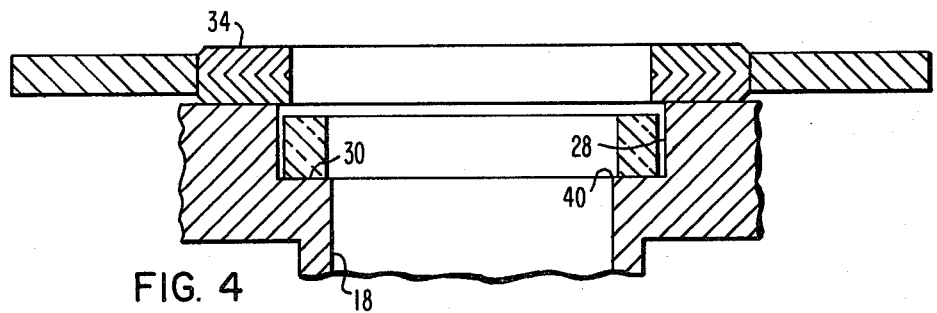
FIG. 4 is a cross-sectional view similar to FIG. 3, showing additional components.

A cylindrical annular deflector 32, of a refractory ceramic material such as AV30 tubing commercially available from the McDanel Refractory Corporation of Beaver Falls, Pennsylvania is positioned against the ledge 30 as shown in FIG. 4. The tubing can be cut and shaped as desired, preferably having a rectangular cross-section through the wall. The inside diameter of the deflector 32 is equal to or slightly larger than the diameter of the bore 18. The outer diameter of the deflector is slightly smaller than the diameter of the bore 28. The clearance between the deflector outer diameter and the bore 28 is only an amount sufficient to allow for thermal expansion between the components. The deflector 32 is retained in place axially between the ledge 30 and a gasket 34. The gasket 34 is preferably of the spiral wound type, for example, as commercially available from the Flexitallic Corporation of Camden, New Jersey. The inside diameter of the gasket 34 is smaller than the outside diameter of the deflector 32, and larger than the inside diameter of the deflector.

Table I presents preferred parameters for the exemplary valve 10 shown.

TABLE I

| Definition | Inches |
| --- | --- |
| Inner bore (18) diameter | 0.984 |
| Outer bore (28) diameter | 1.262 |
| Deflector (32) O.D. | 1.250 |
| Deflector (32) I.D. | 1.000 |
| Gasket (34) I.D. | 1.120 |
| Deflector-bore tolerance | 0.006 |
| Depth of outer bore (28) | 0.250 |
| Depth of deflector (32) | 0.1875 |

With the valve bore, deflector and gasket parameters as disclosed, it has been found that the useful life of stainless steel ball valves through which particulate hydrocarbonaceous matter, such as coal or char fines, at an average particle size between approximately one hundred and one thousand microns, and an average temperature of 110° C., has been increased from a previous useful life from 35 to 50 hours to an experienced useful life of 1100 hours.

It has been theorized that this vast improvement in operating life is a result of two effects. One is the avoidance of direct impact of the particulate matter upon the metallic components, the particles now impacting upon the refractory deflector. The second is a slight change in the flow path through the valve, whereby, on the inlet side, the deflector 32 deflects the flowing particulates toward the center of the aperture 16 in the ball 14. In prior systems, without deflection, particulates would tend to impact along the interior of the bore 18, and particularly cause erosion at the edges identified by reference numerals 36 and 38 in FIG. 1. Similar erosion was experienced at the valve outlet, and is also alleviated by deflector 32 at the valve outlet. It should also be noted that with the disclosed apparatus, a slight chamfer is formed, very early in operating life, through erosion at the corners identified in FIG. 4 by reference numeral 40. No further substantial and rapid erosion is, however, subsequently found.

I claim:

1. An improved ball valve assembly for use in controlling the flow of an erosive fluid, said ball valve assembly of the type wherein a ball having an aperture therethrough is disposed within a housing having a first circular bore therethrough from an outer surface of said housing to another outer surface, said ball being movable between a first position wherein said aperture is aligned with said first bore so as to allow flow through said valve, and a second position wherein said aperture is out of alignment with said first bore so as to preclude flow through said valve, the improvement comprising:

a second circular bore, concentric with and of larger diameter than said first bore, extending from one of said surfaces partially into said housing so as to form an annular ledge within said housing; and an annular deflector for reducing internal erosion of said ball valve assembly, disposed against said ledge, having an outside diameter smaller than the diameter of said second bore and an inside diameter equal to or greater than the diameter of said first bore.

2. The improved valve assembly of claim 1 further comprising a third circular bore, concentric with and of the same diameter as said second bore, extending from the other of said surfaces partially into said housing so as to form a second annular ledge within said housing; and a second annular deflector disposed against said second ledge, having an outside diameter smaller than the diameter of said third bore and an inside diameter equal to or greater than the diameter of said first bore.

3. The improved valve assembly of claim 2 wherein said second annular deflector is of rectangular cross section.

4. The improved valve assembly of claim 2 wherein said second annular deflector is a refractory ceramic material.

5. The improved valve assembly of claim 1 wherein the clearance between the outer diameter of said deflector and said second bore is 0.006 inches, the depth of said second bore is 0.250 inches, and the depth of said deflector is 0.1875 inches.

6. The improved valve assembly of claim 1 wherein said annular deflector is of rectangular cross section.

7. The improved valve assembly of claim 1 wherein said annular deflector is a refractory ceramic material.

* * * * *